United States Patent
Ellis

(10) Patent No.: US 9,360,316 B2
(45) Date of Patent: Jun. 7, 2016

(54) SYSTEM ARCHITECTURE FOR A CONSTANT FOOTPRINT, CONSTANT GSD, CONSTANT SPATIAL RESOLUTION LINESCANNER

(71) Applicant: EXELIS, INC., McLean, VA (US)

(72) Inventor: Kenneth K. Ellis, Columbia City, IN (US)

(73) Assignee: Exelis, Inc., Herndon, VA (US)

( * ) Notice: Subject to any disclaimer, the term of this patent is extended or adjusted under 35 U.S.C. 154(b) by 346 days.

(21) Appl. No.: 13/936,638

(22) Filed: Jul. 8, 2013

(65) Prior Publication Data
US 2015/0008306 A1    Jan. 8, 2015

(51) Int. Cl.
*H01J 40/00*    (2006.01)
*G01C 11/02*    (2006.01)
*G02B 26/10*    (2006.01)

(52) U.S. Cl.
CPC .............. *G01C 11/025* (2013.01); *G02B 26/10* (2013.01)

(58) Field of Classification Search
CPC ........ H04N 1/047; H04N 1/043; G06T 7/004; G06T 7/20; G01J 1/42; G01S 17/66; G01S 17/89; G01C 11/025; G01C 11/02; G01V 8/00; G01V 8/20; G01V 8/10; G02B 26/10
USPC ............ 250/208.1, 559.04, 559.06, 234, 235, 250/236, 221, 347; 356/17, 141.2, 141.4, 356/141.5, 152.1, 152.3
See application file for complete search history.

(56) References Cited

U.S. PATENT DOCUMENTS

| | | | | |
|---|---|---|---|---|
| 3,708,666 A | * | 1/1973 | Barhydt | H04N 3/09 250/236 |
| 4,627,724 A | * | 12/1986 | Cameron | G01S 3/789 250/342 |
| 5,055,683 A | * | 10/1991 | McCracken | G01C 11/025 250/332 |
| 7,961,386 B2 | * | 6/2011 | Danziger | B64G 1/1021 244/158.4 |

FOREIGN PATENT DOCUMENTS

EP    1312892 A1    5/2003

OTHER PUBLICATIONS

International Preliminary Report on Patentability and Written Opinion of the International Search Authority PCT/US/2014/043623, dated Jan. 21, 2016.

* cited by examiner

*Primary Examiner* — Que T Le
*Assistant Examiner* — Jennifer Bennett
(74) *Attorney, Agent, or Firm* — RatnerPrestia

(57) ABSTRACT

A line scanner scans in a cross track direction and moves forward on a platform in an along track direction. The line scanner includes a plurality of detectors forming a left array and a plurality of detectors forming a right array. The left array and the right array are tilted away from a line formed in the along track direction. The left array is configured to detect scene radiance from a surface of an object when the line scanner is scanning the surface on the right side of the line formed in the along track direction. The right array is configured to detect scene radiance from the surface of the object when the line scanner is scanning the surface to the left side of the line formed in the along track direction. The detectors in each respective array are configured to simultaneously detect the scene radiance.

19 Claims, 15 Drawing Sheets

US 9,360,316 B2

SYSTEM ARCHITECTURE FOR A CONSTANT FOOTPRINT, CONSTANT GSD, CONSTANT SPATIAL RESOLUTION LINESCANNER

STATEMENT REGARDING FEDERALLY SPONSORED RESEARCH

The invention described herein was made in the performance of work under a USAF Contract No. FA8803-13-C-0006. The Government has certain rights in this application.

FIELD OF THE INVENTION

The present invention relates in general, to line scanners in imaging systems. More specifically, the present invention relates to line scanners configured to provide a constant footprint, a constant ground sample distance (GSD) and a constant spatial resolution, when the line scanners are scanning a large, non-flat surface of an object.

BACKGROUND OF THE INVENTION

An example of line scanner collection geometry is depicted in FIG. 1A. As shown, an imaging system 10 moves across a surface to be imaged, for example, the imager may be an air-borne or space-borne imager above the Earth. A scanning mechanism scans the limited field of view (FOV) of the imaging system across the surface, transverse to the direction of motion of the imaging system. As the imaging system moves forward in the along track direction 12, the scanner continues to sweep the FOV across the surface as indicated by scan lines 13 in the cross track direction. The combination of scan motion and instrument motion allows the imaging system to observe and measure a region around the ground track that is much larger than the imager's FOV. The scan lines may be pieced together in order to obtain an extensive image of the surface.

A conventional detector array of a line scanner is shown in FIG. 1B. As shown, the scanner includes a 2×6 detector array having 12 detector elements. Each detector element is designated as 15. The 12 detector elements are arranged in a rectangle forming 6 rows and 2 columns. The platform containing the line scanner is moving in the along track direction, while the FOV is scanned in the cross track direction.

A conventional line scan imaging system architecture is depicted in FIG. 2. The imaging system 10 includes a scanner 21, an imaging optics 22, a detector array 23, an electronics module 24 and a data processing module 25. The scanner 21 sweeps the FOV of the imaging optics 22 from side to side. The detector array 23, at the focal plane of the imaging optics, generates an electrical signal, for each detector in the array, that is proportional to the scene radiance. The electronics module 24 converts the detector signals into digital counts, which may then be processed by the on-board data processing module 25. The data may then be transmitted to a ground system, generally designated as 29, via a communications link, designated as 28, where the data may be subjected to additional processing by another data processor system 26. After final processing, an image 27 may be formed for display on a monitor or printer, or may be stored in memory for later retrieval by a viewer.

There are many different scanner architectures that have been used by line scanners. A simple and compact (for a given entrance pupil size) line scanner is a one mirror single-axis scanner, as shown in FIG. 3. The exemplified scanner 30 includes a mirror 31 mounted on a rotating shaft 32. The rotating shaft, or scanner shaft 32 is collinear with both the nominal velocity vector of the vehicle and a telescope optical axis, the latter designated as 33. The angle between the scanner shaft 32 and a normal to the surface of mirror 31 is 45°. The scanner shaft rotates at a constant rate forming a rotation angle about the scanner shaft (which is defined later as $\theta_{scan}$). The scanner also scans the FOV 34 of the optics of the telescope across the surface of the Earth in the cross track direction. While scanning in the cross track direction, the scanner moves through nadir and a maximum scanning angle, the latter formed at the an end of scan (EOS). Generally, the Earth surface data is only collected for scan angles within 56° of nadir, for reasons that will be explained later.

Conventional image scanners suffer from three major shortcomings, namely, (a) unwanted image rotation during scan due to the angles of incidence on the mirror's surface changing for the off-axis optical rays as the scanner shaft rotates, (b) a large resulting footprint (which is the projection of the instantaneous FOV of a detector onto the ground), and a corresponding lowered spatial resolution with increasing scan angle, and (c) a ground sample distance (GSD) getting larger with increasing scan angle. These are explained below.

The first shortcoming is due to a single mirror scanner geometry causing the image to rotate on its focal plane. The image rotation relative to a fixed detector array is equivalent to rotation of the detector array relative to a fixed Earth. Some conventional systems, like VIIRS, use an additional moving mirror to remove this rotation. The additional moving mirror adds mass, complexity, and moving parts to the system with more potential for failure. Other systems, like AVHRR and GOES, accept the rotation as a required fact. The AVHRR system only has one detector per channel and, thus, minimizes the effect of the image rotation. The GOES system, however, has 2 or 8 detectors per channel and must consider the errors caused by the rotation. A saving grace for the GOES system is that the rotation is only a few degrees across the scan axis. In general, however, any rotation of the image greatly complicates the use of linear detector arrays.

The quality of the imagery collected by a line scanner is also affected by the collection geometry, as shown in FIG. 4. The geometry is shown as a function of range to the center of the Earth. Both air-borne and space-borne image resolution suffers, because the range to the Earth changes with scan angle. As may be seen in FIG. 4, both range to the surface of the Earth (R) and the LOS zenith angle ($\theta_z$) to the ground surface increase with scan angle θ in the cross track direction. The magnitude of the effect depends on the altitude h of the imager above the Earth. It is much worse for a space-borne imager, since h and R become much larger than similar parameters for an aircraft-borne imager.

The problem of footprint growth may be best illustrated by mapping the instantaneous FOV (IFOV) of an AVHRR system onto the ground of the Earth at both nadir and at end-of-scan (EOS) of the scanning mirror. This is shown in FIG. 5. As shown, the collection geometry distorts the IFOV, so that a 1×1 km square IFOV at nadir becomes, approximately, an 8×3 km rhombus at EOS. Since spatial resolution depends strongly on the IFOV, the resulting spatial resolution is significantly degraded at EOS. For the AVHRR system, the spatial resolution becomes so poor at scan angles larger than 56° that the data would be of little use to any users and so is not even collected. Most users likely prefer to have the same high resolution at EOS that they can obtain at nadir.

An additional shortcoming of conventional systems is the non-uniform ground sample distance (GSD) between nadir and EOS. In order to reduce design complexity, most line scanners use a constant scan rate and a constant detector sample rate. These constant rates result in a varying distance between samples on the ground. The GSD of the AVHRR system, for example, grows from nadir to EOS in proportion to the IFOV growth from nadir to the EOS. Most users, in contrast, prefer to have images that are sampled at equal intervals on the ground and, thus, result in equal GSDs.

As will be explained, the present invention overcomes the aforementioned shortcomings, by producing a system that collects data at a constant footprint, a constant GSD, and a constant spatial resolution. The present invention achieves all of this when scanning the Earth, or any other extended object.

SUMMARY OF THE INVENTION

To meet this and other needs, and in view of its purposes, the present invention provides a detector array of a scanner for scanning an object. The detector array includes: a plurality of detectors, in which half of the detectors are linearly arranged as a left array, and the other half of the detectors are linearly arranged as a right array; and the left and right arrays are arranged geometrically to form an isosceles triangle having two equal base angles of $\psi_{max}$, and an intersecting apex. The angle of $\psi_{max}$ is defined as a maximum amount of image rotation caused by a geometry of the scanner, as the detector array is scanning the object.

The plurality of detectors are disposed in an air-borne, or in a space-borne platform. The platform is configured to move in an along track direction, and a scan angle of the detector array is formed in a scan line that scans in a cross track direction, which is perpendicular to the along track direction. The scan angle of the detector array includes an end of scan (EOS) angle defined in the cross track direction. A maximum amount of image rotation in $\psi_{max}$ may equal the EOS angle.

Each of the plurality of detectors in the left array are configured to simultaneously generate an electrical signal proportional to scene radiance of the object; and each of the plurality of detectors in the right array are configured to simultaneously generate another electrical signal proportional to scene radiance of the object. The left array includes at least two linearly arranged detectors, and the right array includes at least two linearly arranged detectors.

The scanner includes a mirror that rotates about a shaft, and a telescopic optical axis that intersects the mirror, where the shaft of the mirror is configured to be parallel to the telescopic optical axis. A scan angle of the detector array varies between (a) nadir, which corresponds to a line extending from a middle of a base of the isosceles triangle and intersecting at the apex, and (b) an end of scan (EOS), which corresponds to a maximum angle between the line extending from the middle of the base to form the nadir and a maximum scan angle projected onto the object. A maximum amount of image rotation in the angle of $\psi_{max}$ is equal to the scan angle of the detector array at the EOS. A maximum angle of $\psi_{max}$ may be larger than 56 degrees.

The right array is tilted by an amount equal to a maximum angle of $\psi_{max}$, and the left array is tilted in an opposite direction by an amount equal to the maximum angle of $\psi_{max}$.

The maximum angle of $\psi_{max}$ corresponds to a maximum scan angle of the detector array in a direction perpendicular to a direction of travel of a platform.

The detector array is configured to provide a left scan of the object and a right scan of the object, where a dividing line between the left scan and the right scan is formed by a line extending from a middle of a base of the isosceles triangle to the intersecting apex. The left array is configured to collect imagery during the right scan, and the right array is configured to collect imagery during the left scan.

Another embodiment of the present invention includes a line scanner scanning in a cross track direction and moving forward on a platform in an along track direction. The line scanner includes a plurality of detectors forming a left array and a plurality of detectors forming a right array, wherein the left array and the right array are tilted away from a line formed in the along track direction, the left array is configured to detect scene radiance from a surface of an object when the line scanner is scanning the surface on the right side of the line formed in the along track direction, and the right array is configured to detect scene radiance from the surface of the object when the line scanner is scanning the surface on the left side of the line formed in the along track direction.

The left and right arrays each includes more than two detectors arranged linearly in the respective array, and the detectors in each respective array are configured to simultaneously detect the scene radiance.

The left and right arrays are configured to simultaneously detect the scene radiance and output signal samples, as the line scanner scans between nadir and an end of scan (EOS), and the output signal samples are aggregated in the along scan direction and in the cross track direction.

The output signal samples are first aggregated in the along track direction and, second aggregated in the cross track direction, and the first and second aggregation form one scan line.

Yet another embodiment of the present invention is a method of scanning a surface of the Earth, in which multiple detectors are aligned linearly in an airborne, or space borne platform for simultaneously sampling the surface. The method includes the steps of:

reconfiguring the multiple detectors, so that:

a first half of the detectors are tilted away in a left direction from a line formed in the along track direction, and a second half of the detectors are tilted away in a right direction from the line formed in the along track direction; and using the first half of the detectors to sample radiance from the surface, when the line scanner is scanning on the right side of the line, and using the second half of the detectors to sample radiance from the surface, when the line scanner is scanning on the left side of the line.

The method reconfigures the multiple detectors by forming a bees-wing geometry, and the bees-wing geometry is defined as an isosceles triangle formed by the first and second half of the detectors as two equal sides of the isosceles triangle having two equal base angles of $\psi$, and wherein $\psi$ is defined as an amount of image rotation caused by a geometry of the scanner, as the detectors are scanning the surface.

The isosceles triangle includes an apex that is intersected by the two equal sides of the isosceles triangle and the line formed in the along track direction. The angle $\psi$ includes a maximum angle that is dependent on a maximum scan angle in a cross track direction, which is perpendicular to the along track direction.

It is understood that the foregoing general description and the following detailed description are exemplary, but are not restrictive, of the invention.

DETAILED DESCRIPTION OF THE INVENTION

Figure 1A:
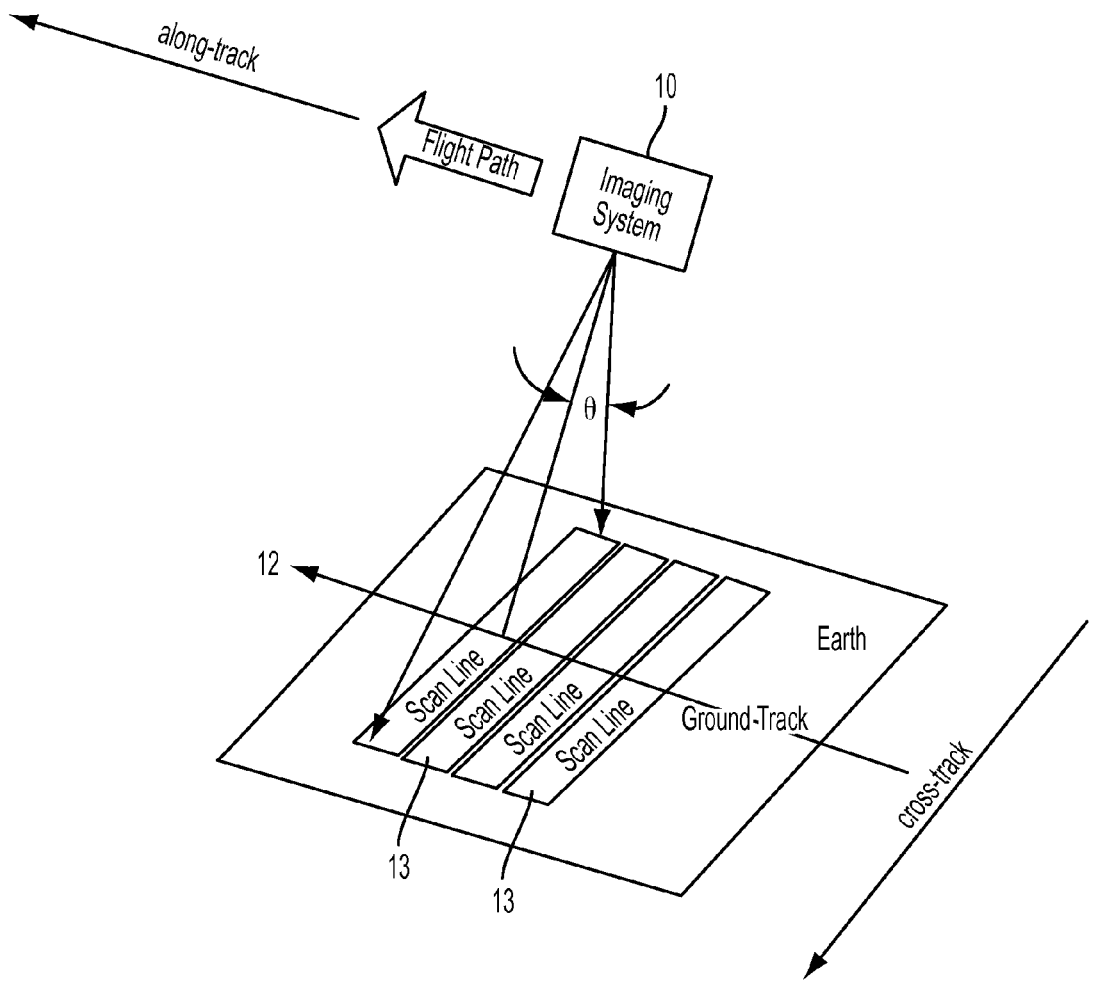
FIG. 1A is an example of a line scanner of an imaging system collecting images along a field of view (FOV), as the imaging system moves along a ground track direction.
Figure 2:
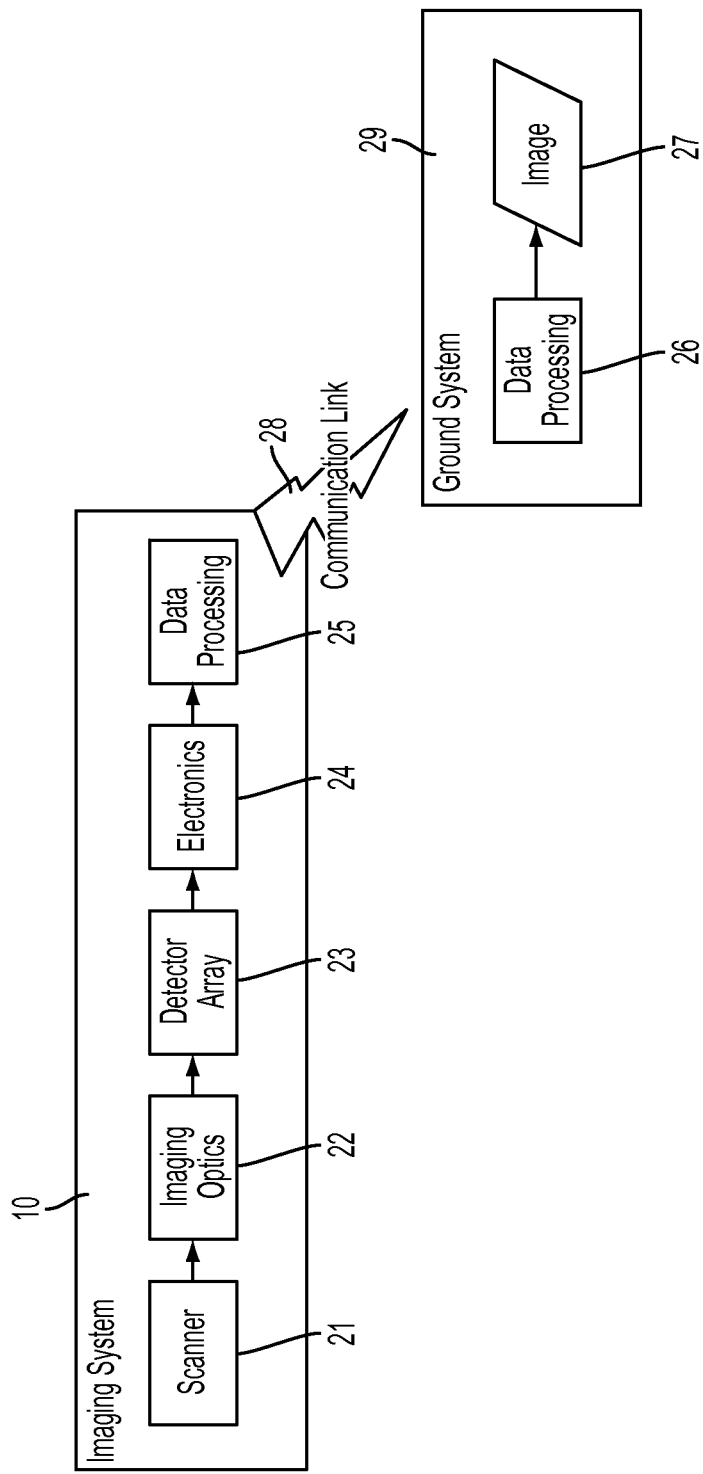
FIG. 2 is an example of a line scanner architecture that may be configured by the present invention, in accordance with one embodiment.

The present invention uses the collection geometry illustrated in FIG. 1A while disposed in a system that is exemplified in FIG. 2. Accordingly, the imaging system of the present invention includes a line scanner 21 incorporating scan mirror 31 that moves the optical axis 33 of a telescope along a scan line 13 and linearly scans the surface of an extended object, for example, the surface of the Earth. The line scanner 21 may be disposed in an airborne platform or a space borne platform which is moving along a ground track direction providing the scan lines 13 shown in FIG. 1A.

The present invention, however, does not have the shortcomings of conventional systems and overcomes the aforementioned difficulties using a combination of detector array geometry and signal processing. As will be explained, the detector array geometry uses rectangular elements that are rotated at nadir so that the elements are aligned with the scan direction at the end of scan (EOS). The element sizes are selected so that the footprint formed at EOS on the surface of the Earth (for example) is approximately a square. The detector elements form footprints which are then aggregated, as will be explained, in order to produce equivalent footprint sizes (for example, a square) at all smaller scan angles.

Figure 4:
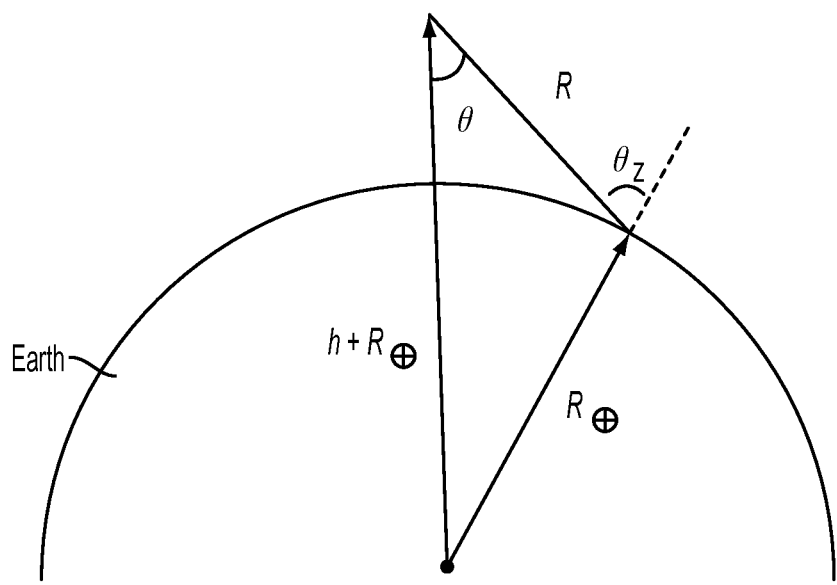
FIG. 4 is an example of the geometry of a line scanner when scanning the surface of the Earth, showing how range and zenith angle increases when the scan angle increases.

The combination of the array with single axis scanner geometries and the footprint aggregations is fairly insensitive to both the range to the Earth's surface and the line of sight (LOS) zenith angle at the Earth's surface, even though both change significantly with scan angle. This may be visualized by examining FIG. 4. As will be explained, the present invention provides an elegant solution to a persistent problem in low Earth orbit (LEO) and airborne imaging.

Figure 5:
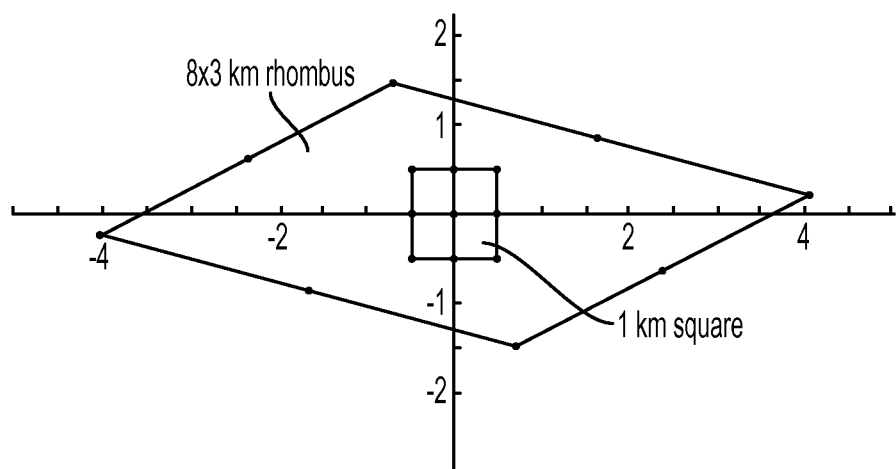
FIG. 5 is an example of detector footprints, in which the square is the footprint at nadir and the large rhombus is the foot print at end of scan (EOS), resulting from conventional scanners.

As previously described with respect to FIG. 5, the scanner geometry of conventional systems causes the image on a detector array to rotate. In the case of the scanner depicted in FIG. 3, the image rotates by an angle equal to the scanner shaft rotation angle. Rather than letting image rotation be a liability, the present invention takes advantage of the rotation in order to obtain a nearly constant footprint.

The detector array geometry takes advantage of the scanner image rotation to achieve three objectives. First, the detector footprints at the end of scan (EOS) are square, with the sides aligned to the along-scan direction and cross-scan direction. Second, the effective footprint obtained by aggregating samples from the array is approximately the same size for all scan angles. Third, both the effective footprint and the ground track are symmetric about nadir.

Figure 1B:
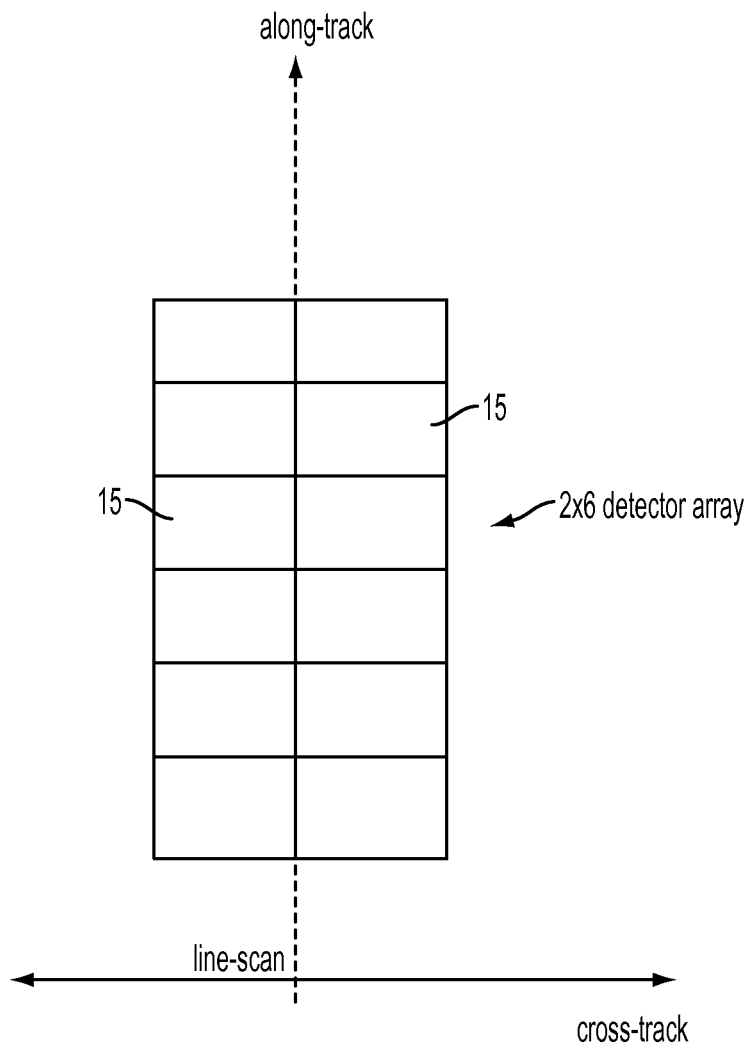
FIG. 1B is an example of a conventional line scanner detector array geometry having a 2×6 detector array, arranged in a rectangle, and line scanning in the cross-track direction, while the platform moves in the along-track direction.
Figure 6A:
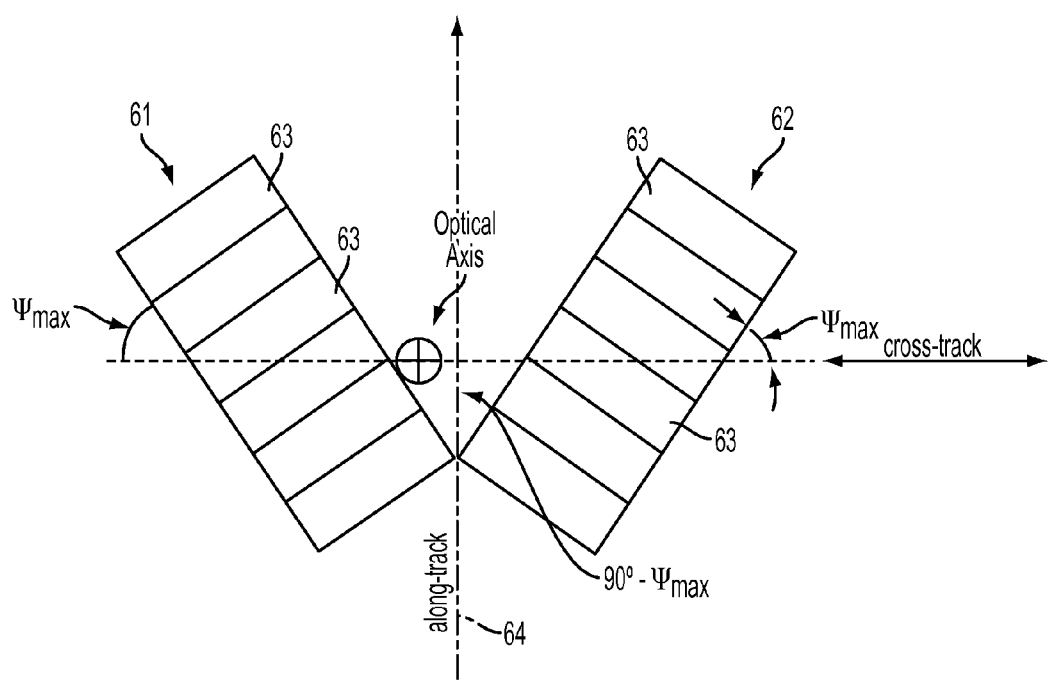
FIGS. 6A and 6B depict a bees-wing detector array geometry, which is shown projected on the ground at nadir, in accordance with an embodiment of the present invention.

The detector array, which in conventional scanners is linear along the along track direction of vehicle travel (for example, rectangular in form as shown in FIG. 1B), is reconfigured by the present invention. The rectangular elements, or detectors 63 of the present invention are arranged in a bees-wing configuration, as depicted in FIG. 6A. Each half of the array (also referred to herein as a left array 61 and a right array 62) is tilted by an amount equal to the maximum image rotation angle (i.e. the image rotation angle at the end of scan), which is defined herein as $\psi_{max}$.

Figure 3:
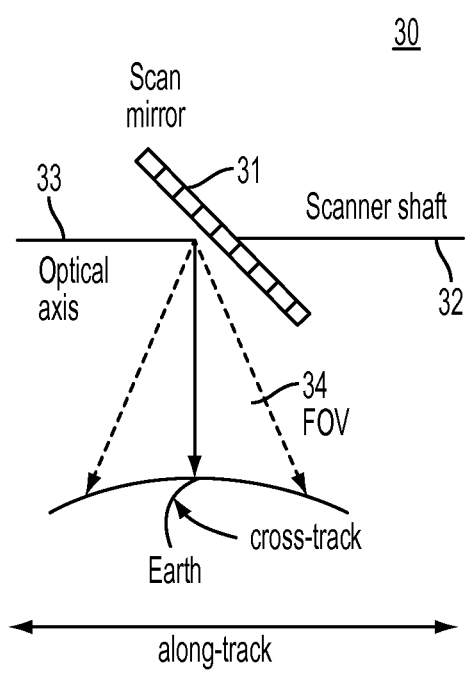
FIG. 3 is an example of a scanner geometry as the scanning angle is changed by using a scan mirror disposed in the imaging system shown in FIG. 2.

In the line scanner exemplified in FIG. 3, the scanner shaft 32 is parallel to the optical axis 33 of the telescope. As such, the maximum image rotation angle of $\psi_{max}$ is equal to the scan angle $\theta$ formed at the end of scan (EOS) of the line scanner in the cross track direction; it is also equal to the rotation angle of the mirror shaft $\theta_{scan}$ at EOS. As an example, the maximum scan angle of the line scanner may be 56° but other angle limits are contemplated by the present invention, when used with appropriate adjustments made to the size and number of array elements.

In addition, it will be understood that the invention may be applied to scanning architectures other than that shown in FIG. 3. These other scanner architectures may rotate the image by an amount not equal to the scan angle $\theta$ of the line scanner at the EOS. One such scanning architecture is shown in FIG. 12. As shown, scan mirror 31 includes an optical axis 33 and a rotation axis 120 about the shaft of the mirror. In this configuration, the telescope optical axis 33 is not parallel to the rotation axis 120 and the angle between the mirrored surface and the mirror rotation shaft is not 45°. In the example of FIG. 12, each half of the detector array may be tilted by an amount equal to and in an opposite direction to the maximum image rotation of $\psi_{max}$ formed at EOS. In the example of FIG. 12, $\psi_{max}$ is not equal to the mirror rotation angle of $\theta_{scan}$. This is further described with respect to FIGS. 11A and 11B.

Referring to FIG. 6A, the array may not be centered on the optical axis, but may be offset as shown by a small amount. For example, the offset may be 115 micro-radians in the cross track direction and away from the along track vector designated as 64. This offset causes the image rotation to compensate for the forward motion of the platform, thereby producing a scan pattern that is symmetric about nadir.

Figure 6B:
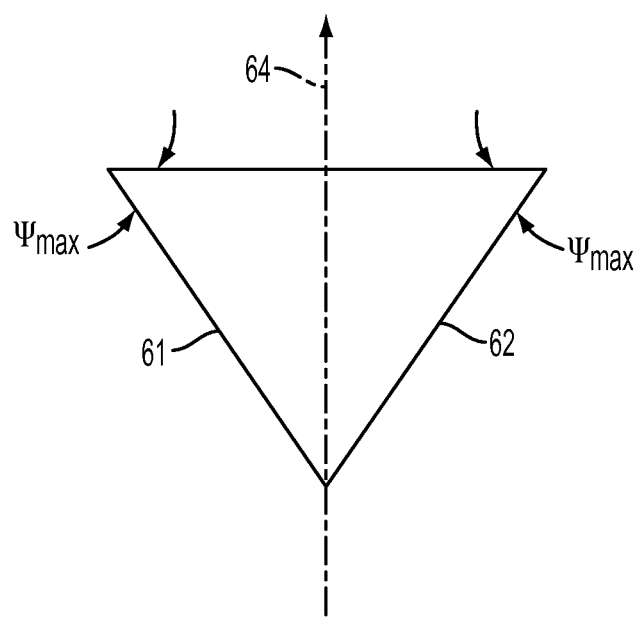

The geometry formed by the bees-wing configuration, shown in FIG. 6A, may also be described by the isosceles triangle shown in FIG. 6B. The isosceles triangle is formed by two equal sides extending from a base line. The sides are comprised of the left and right arrays 61, 62. The tilt angle, referred to herein as the maximum image rotation angle of $\psi_{max}$ is formed between the base line and each side of the triangle. Both sides of the triangle intersect at an apex that is joined by line 64, the latter representing the along track direction shown in FIG. 6A. It will be understood that the bees-wing geometry shown in FIG. 6A is the array geometry projected on the ground at nadir.

Figure 7:
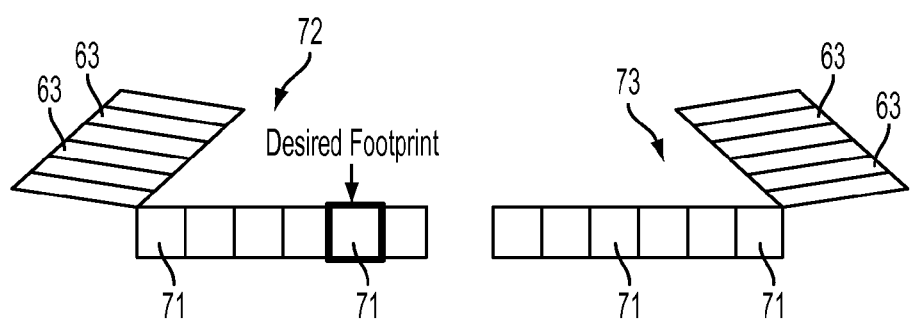
FIG. 7 is the bees-wing detector array geometry, which is shown projected on the ground at end of scan (EOS), in which the diagram on the left is the footprint at left EOS and the diagram on the right is the footprint at right EOS, in accordance with an embodiment of the present invention.

The element sizes of detectors 63 may be selected so that the element footprints at EOS are equal to a desired footprint size, as shown in FIG. 7, where each desired footprint is designated as 71. The figure separately shows the bees-wing detector array footprints for the left EOS 72 and the right EOS 73. The figure exemplifies the combined effects of image rotation, increasing range, and Earth curvature for an imager flying at an 833 km altitude. The shown six detector elements on each side of the array provide six square footprints 71, and have their sides aligned with the along-scan and cross-scan directions.

It will be appreciated, however, that only one half of the array (for example, the left array or the right array) is aligned at any one time, while the geometry of the other half of the array (for example, the right array or the left array, respectively) is significantly distorted. Thus, the data is only collected from one side of the array at a time. The left half of the array is used to collect imagery during the right half of the scan, and the right half of the array is used during the left half of the scan. In this manner, the present invention ensures gapless coverage at nadir, when switching from one side of the array to the other side.

The manner in which the present invention processes the signal data will now be described by reference to FIG. 8 As shown in a functional flow diagram, detector signal processing is generally designated as 80. By tracking the mirror position in step 81, considering the aircraft or spacecraft roll angle in step 82, and incrementing the mirror angle by a predetermined amount in step 83, the processor is able to keep track of the lines of sight of the detector elements as they sample radiance received from the surface of the object (the Earth, for example). All the detectors or elements of one side of the array simultaneously sample the ground radiances. Thus, with six detectors on the left side of the array, for example, the system receives six simultaneous samples for the six detectors in the left array in one instant of time.

The raw samples from a given detector in the array are first aggregated in the along-scan direction by step 84. The number aggregated is a function of the scan angle from nadir. The angular range for each aggregation factor may be selected so that aggregation produces similar system MTFs for all scan angles. Along-scan aggregation, performed by the present invention, thus serves three purposes:
1. It increases the SNR of the resulting samples.
2. It regularizes the MTFs of the resulting samples, thereby reducing the complexity of the resampling algorithm that follows the aggregation process.
3. It reduces the amount of data that must be handled by the processor.

Figure 8:
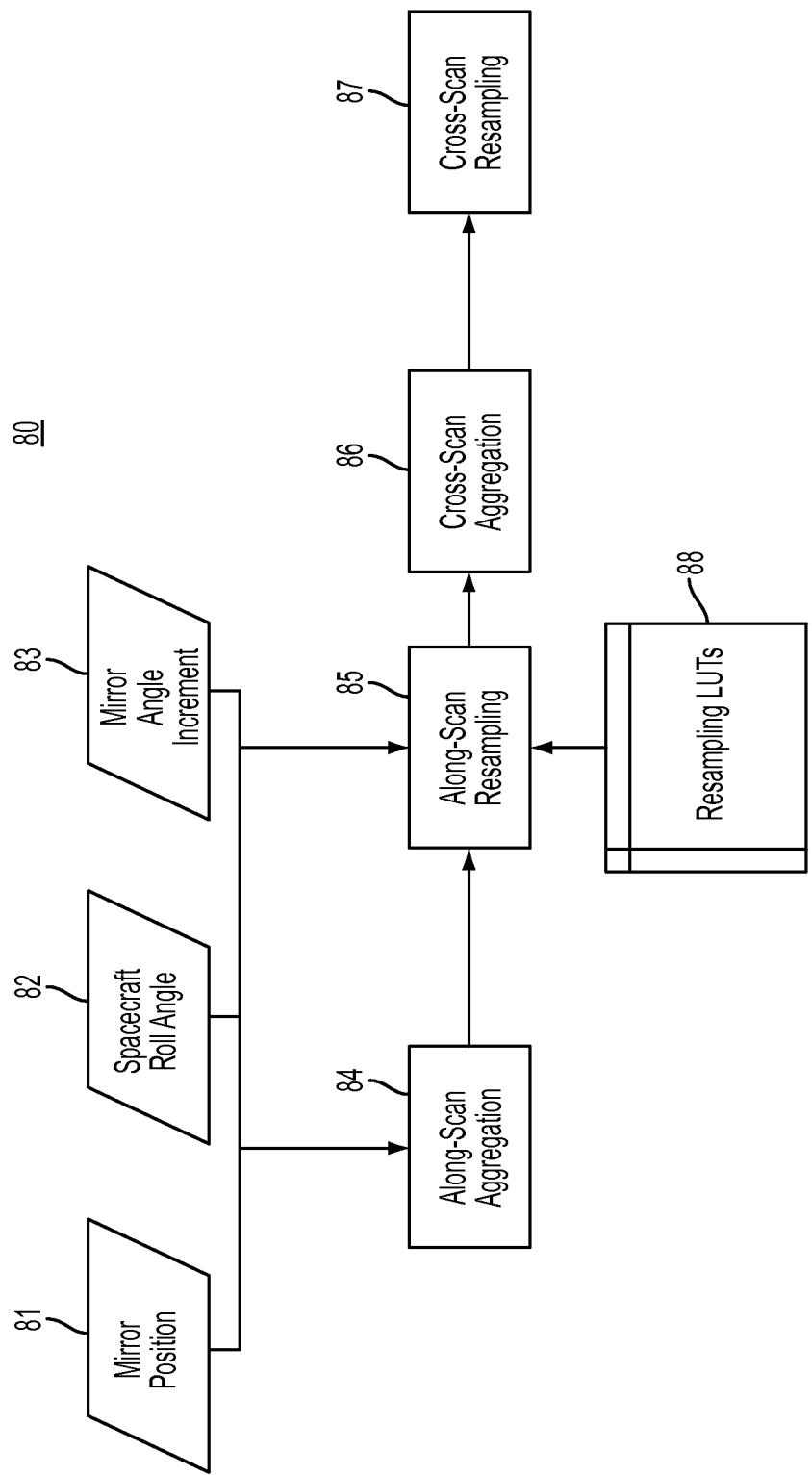
FIG. 8 is a flow diagram showing an example of detector signal processing provided by the present invention, in accordance with an embodiment of the present invention.

Continuing the process shown in FIG. 8, the along scan aggregation step 84 is followed by an along-scan resampling step 85. This step places the resampled values from every detector element on the same along-scan grid. Stated differently, the resampling changes a one-dimensional grid (first grid) at the time of sampling the raw data into another one-dimensional grid (second grid) at the time of the resampling process. Nominally, the second grid starts at nadir and has an equal spacing on the ground, while the first grid is equally spaced in scan angles but unequally spaced on the ground. Any origin and spacing may be specified by the user. This step produces a uniform GSD across the scanline.

The present invention then enters step 86 and aggregates the resampled values from different detector elements that have the same along-scan location. By resampling in step 85, prior to cross-scan aggregation in step 86, the present invention does not incur an along-scan spatial resolution penalty when aggregating. The along scan resampling step 85 may access a look up table (LUT) stored in memory 88.

The cross-scan aggregation in step 86 serves two purposes:
1. It increases the footprint of each resulting pixel from that of a single element to a final desired value.
2. It improves the SNR of the pixels.

It will be appreciated that the cross-scan processing at this point is aggregation in step 86, instead of resampling in step 87, the latter being performed after aggregation. The cross scan aggregation simplifies any calibration to be performed later. Pixels typically are calibrated using coefficients derived from aggregated space and ICT data. If resampling was performed at this point instead of aggregating, the calibration algorithm would require incorporation of the resampling coefficients used in the calibration. This would not be complex if a constant resampling kernel was used, but it would add significant complexity to calibration if a varying kernel was needed.

It will be understood that scan mirror and FPA geometry cause the cross-scan locations of the pixels to change with scan angle, as described below. Thus, a final cross-scan resampling, performed in step 87, is required in order to obtain imagery on a Cartesian grid.

Figure 9A:
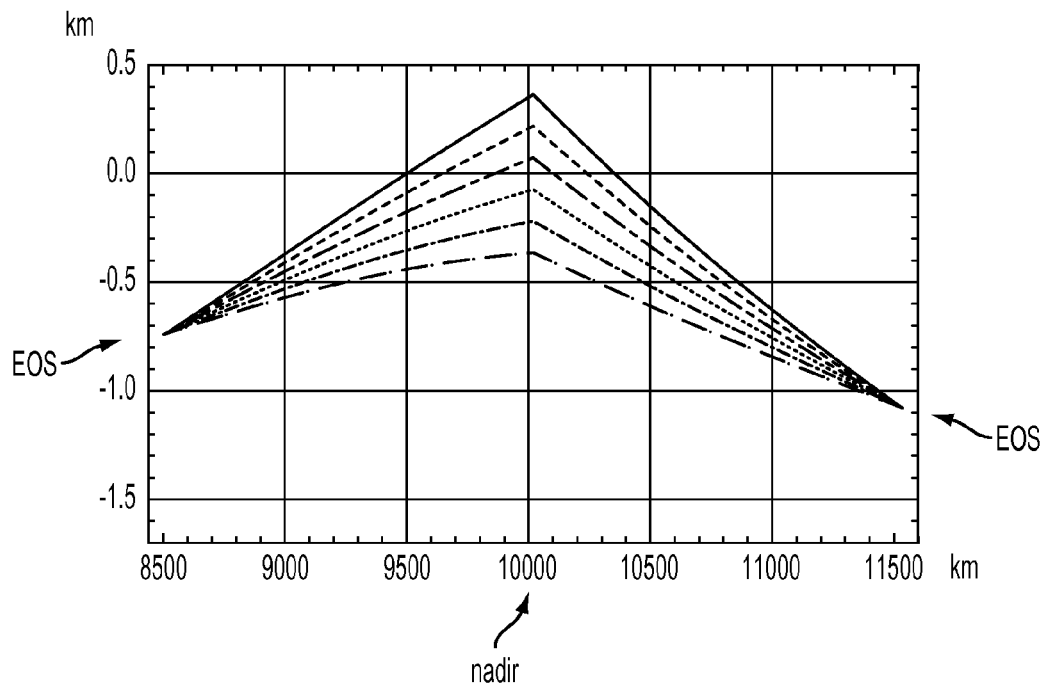
FIG. 9A is an example of the ground tracks of the six detector elements of a bees-wing array, showing the skew caused by forward motion when the array is centered on the optical axis, in accordance with an embodiment of the present invention.
Figure 9B:
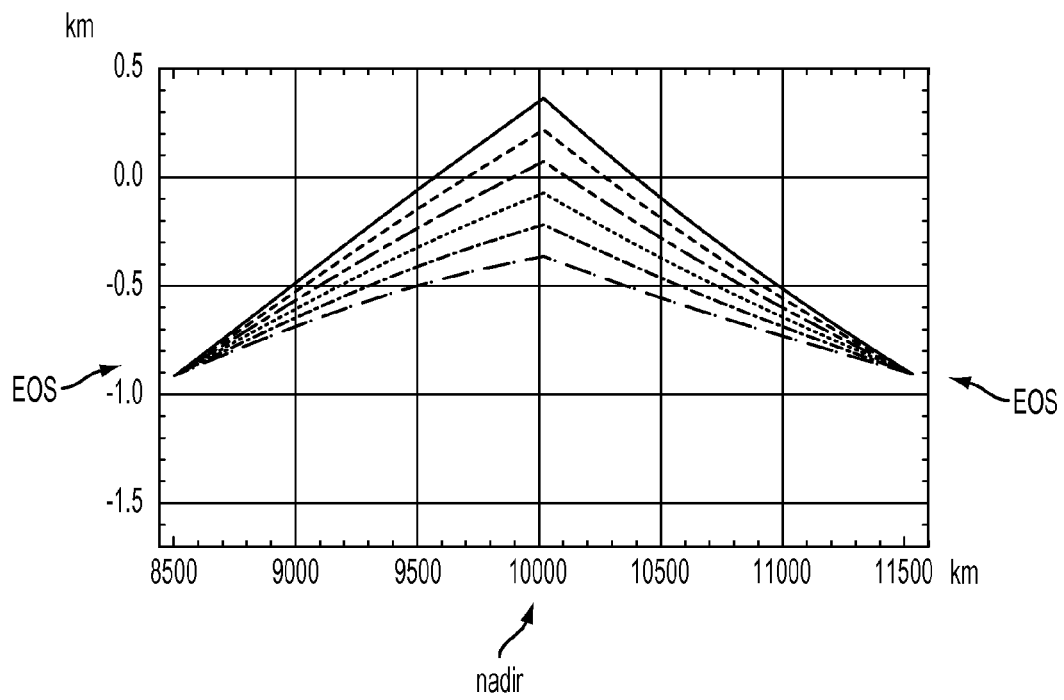
FIG. 9B is another example of the ground tracks of the six detector elements of a bees-wing array with forward motion compensated by offsetting the array from the optical axis by a small amount, in accordance with an embodiment of the present invention.

The ground tracks for a single scan line of the 12 elements, or 12 detectors used in the left and right arrays, shown in FIG. 6A, are plotted in FIGS. 9A and 9B for a platform at an 833 km altitude. The units on both axes in each figure are km, but the scales on the two axes are very different. The FIG. 9A shows the ground tracks of the 12 detectors in a bees-wing array, in which the ground tracks are skewed, due to the forward motion of the sensor during the scan. The FIG. 9B, on the other hand, shows the ground tracks of the 12 detectors in the same bees-wing array, in which the ground tracks are not skewed, due to forward motion compensation. It will be appreciated that the forward motion compensation is provided by the present invention by offsetting the array from the optical axis, for example, by 115 micro-radians, as shown in FIG. 6A.

Figure 10:
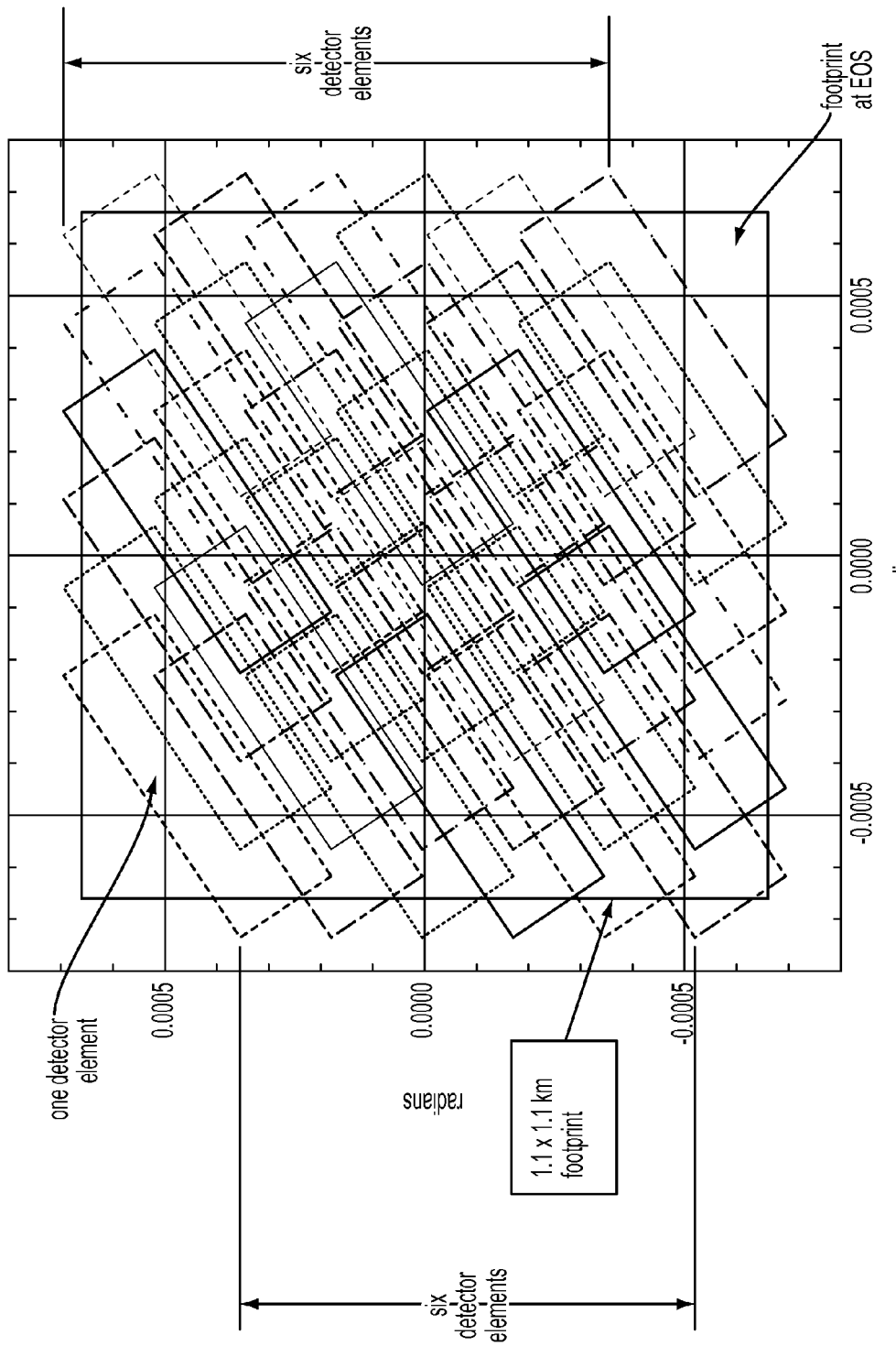
FIG. 10 is an example of the footprints at nadir that are aggregated in the along scan and cross scan directions, and compared to the footprint at EOS for a single detector element, in accordance with an embodiment of the present invention.

The scan mirror image rotation causes the EOS footprints to lag behind the nadir footprints by about 0.5-1.2 km, depending on the element's cross-scan position in the array, as shown in FIGS. 9A and 9B. The abrupt change in direction at nadir occurs when the imager switches from the left array side to the right array side, or vice versa. The elements all converge at EOS, as is expected from examining FIG. 7. This allows the present invention to perform the cross-scan aggregation without incurring a loss of cross-scan spatial resolution at EOS. The effective footprint of the aggregated elements is easy to determine at EOS. The centers of all six elements have the same cross-scan location and the along-scan resampling gives them the same along-scan location. Thus, the effective footprint is equal to the footprint of an individual element. This is shown as the 1.1 km square in FIG. 10. The rotation and cross-scan separation of the element footprints at nadir introduces some ambiguity into the definition of the effective footprint. It is not clear that the exact value obtained by any method is all that important, since neither the spatial resolution nor the GSD depends on the footprint definition, and those are the spatial quantities that drive data quality, not footprint. Nevertheless, a comparison is shown of the single detector footprint at EOS with the individual element footprints that are aggregated at nadir in FIG. 10. Thus, as shown, the effective, or aggregated footprints at nadir and EOS are equivalent. Effective footprints at nadir and effective footprints at EOS are so similar that the effective footprint does not vary much between those extremes.

Figure 11A:
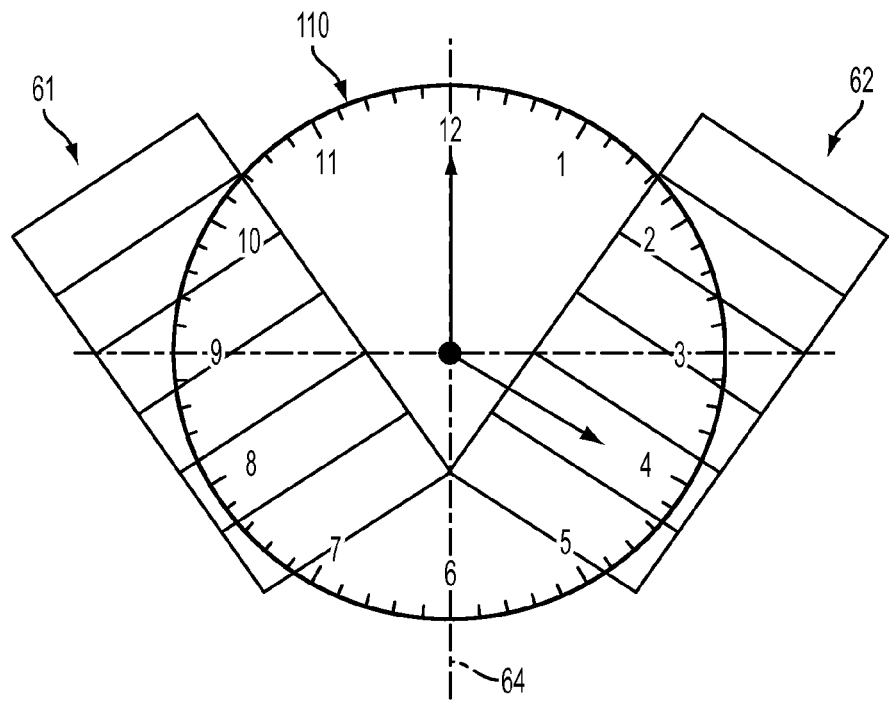
FIG. 11A depicts an image on a focal plane of a clock-face, when the clock is positioned at nadir, and the image has not yet rotated, thereby having an image rotation angle ($\psi$) of zero.
Figure 11B:
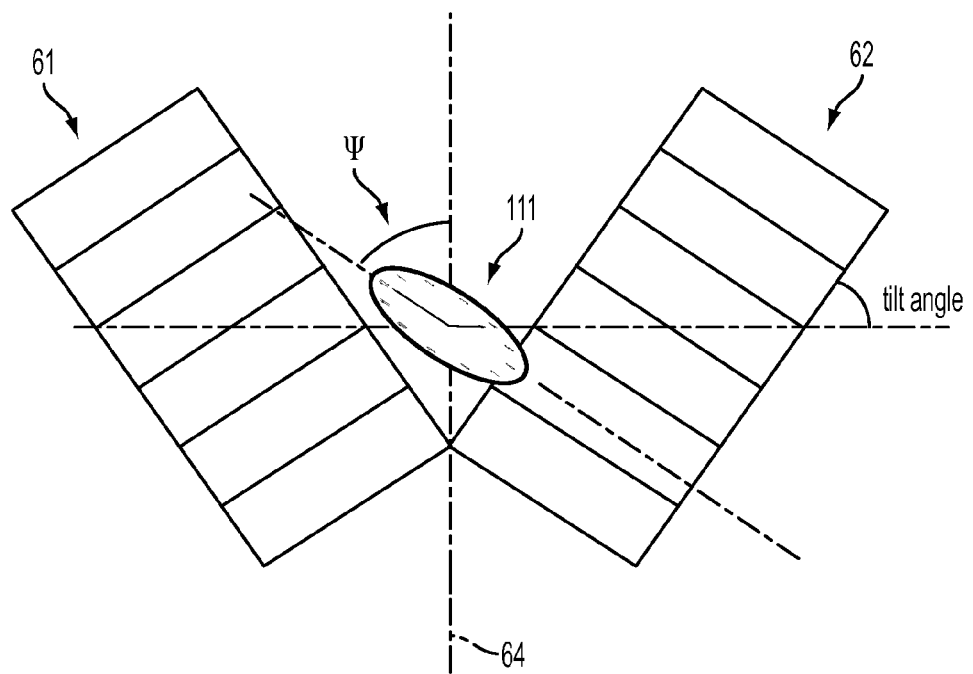
FIG. 11B depicts another image on the focal plane of the clock-face of FIG. 11A, when the clock is positioned at the end of scan (EOS), and the image has rotated by an amount of $\psi$ greater than zero.
Figure 12:
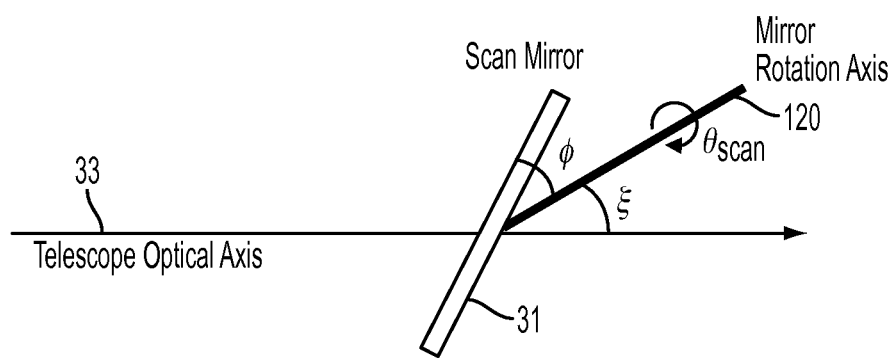
FIG. 12 depicts the geometry of a one-mirror scanner rotating about an arbitrary rotation axis along its shaft by a rotation angle of, thereby producing the image rotation of $\psi$ shown in FIG. 11B.

Turning now to FIGS. 11A and 11B, there are shown two images of the face of a clock, designated respectively as 110 and 111. Image 110 of the clock-face is formed on the focal plane when the clock is positioned at nadir. Image 111 of the clock-face is formed on the focal plane when the clock is positioned at the EOS. The image on the focal plane rotates through an angle $\psi$, which for the scanner geometry of FIG. 3 is equal to the cross track scan angle $\theta$ of FIG. 4. The image of the clock-face is distorted by the increased range and zenith angle when the rotation of the shaft of the mirror points the optical axis to large scan angles. It will be understood that the maximum image rotation angle of $\psi$ forms the tilt angle in the bees-wing configuration shown in FIG. 11B, namely the angle of $\psi_{max}$.

In the example scan configuration shown in FIG. 3, the image on the focal plane rotates through an angle equal to the cross track scan angle $\theta$ and, therefore, $\psi$ is equal to the cross track scan angle $\theta$ of the detector array at the EOS. The important parameter in determining the tilt angle, however, is not the cross track scan angle at the EOS but the amount of image rotation caused by the line scanner. This amount may or may not be equal to the cross track scan angle, depending on the scanner geometry.

Turning next to FIG. 12, there is shown another exemplary geometry of a scan mirror 31 as it rotates on its mirror rotation axis, designated generally as 120. The relationship between the image rotation angle, $\psi$, and the scan angle of the mirror $\theta_{scan}$ (denoted below as $\theta s$) is given by the following expression:

$$\tan\psi = \frac{[2n_x n_y - \sqrt{2}\, n_y(n_x + n_z)]\cos\theta s - \left[2n_x n_z - \sqrt{2}\, n_z(n_x + n_z) + \frac{1}{\sqrt{2}}\right]\sin\theta s}{2n_x^2 - \sqrt{2}\, n_x(n_x + n_z) + \frac{1}{\sqrt{2}} - 1}$$

where $n_x = -\sin\phi\cos\xi + \cos\phi\sin\xi\cos\theta s$ $n_y = -\cos\phi\sin\theta s$ $n_z = \sin\phi\sin\xi + \cos\phi\cos\xi\cos\theta s$ $\phi$ is the angle between the scan mirror rotation axis and the mirror's surface, and $\xi$ is the angle between the scan mirror rotation axis and the telescope optical axis.

In the definitions of angles used by the present invention, the following provides a brief summary:

$\theta_{scan}$ is the mirror shaft rotation angle.

$\theta$ is the optical axis rotation angle in the cross track plane.

$\psi$ is the image rotation angle on the focal plane.

When the image rotates by $\psi$, the projection of the detector area on the ground rotates by $-\psi$.

For the scanner depicted in FIG. 3, $\psi=\theta=\theta_{scan}$.

Figure 13:
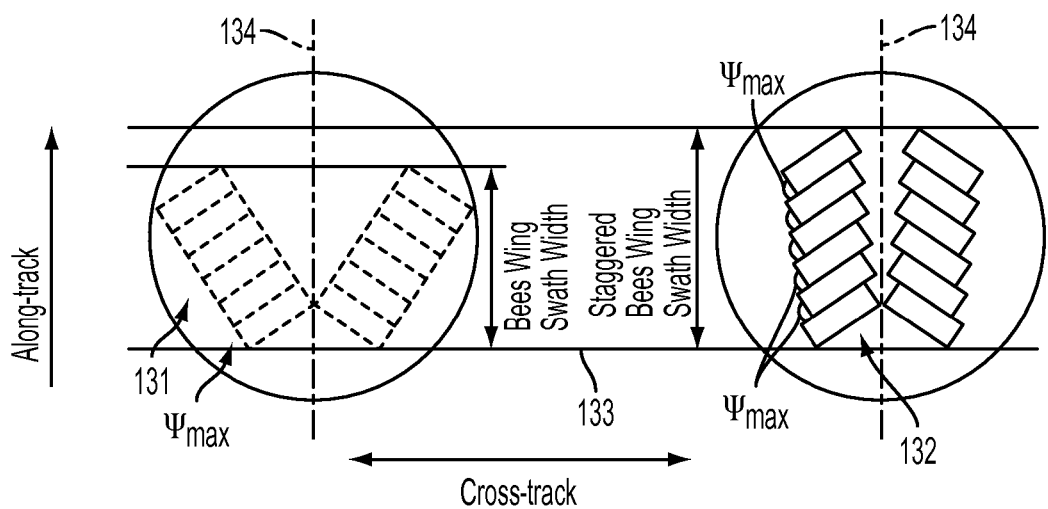
FIG. 13 depicts a non-staggered bees wing geometry and a staggered bees wing geometry, in accordance with two embodiments of the present invention.

Referring next to FIG. 13, shown are two different bees-wing configurations, namely a non-staggered bees-wing configuration 131 and a staggered bees-wing configuration 132. The non-staggered bees-wing configuration 131 is similar to the configuration shown in FIG. 6A. The detectors of the staggered bees-wing configuration 132 are tilted at the same angle as the detectors of the non-staggered configuration. Thus, each detector is tilted away from the along-track direction 134 to form an angle of $\psi_{max}$ with respect to the cross-track direction 133, as shown.

The staggering of the detectors in the array allows the along-track spatial response and dimension of the array to be increased without either degrading cross-track performance or increasing the field of view (FOV) of the telescope. In fact, the telescope FOV may be smaller for the staggered geometry. The figure shows the FOV as circles circumscribing the detector arrays. With the same number and size of elements, a more compact array is achieved that also has an increased extent in the along-track direction. The cross-track performance depends on the element size and rotation angle only, both of which are unchanged. Thus cross-track performance is unchanged by staggering the array elements.

The present invention includes many applications, for example:

1. space borne remote sensing systems,
2. airborne remote sensing systems, and
3. industrial inspection systems that use a line scanner to view items on a moving conveyer belt.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A scanner comprising:
   a single sided scan mirror centered on a telescopic optical axis of the scanner and coupled to a rotating shaft, wherein the rotating shaft couples to the scan mirror at an angle offset from the telescopic optical axis;
   a detector array including a plurality of detectors, in which half of the detectors are linearly arranged as a left array of the detector array, and the other half of the detectors are linearly arranged as a right array of the detector array, the detector array receiving an image of a surface of the Earth from the single sided scan mirror; and
   the left and right arrays of the detector array are arranged geometrically to form an isosceles triangle having two equal base angles, each base angle equal to an angle of $\psi_{max}$, and an intersecting apex,
   wherein the angle of $\psi_{max}$ is defined as a maximum amount of image rotation caused by a geometry of the single sided scan mirror and the rotating shaft that causes the received image to be rotated on a focal plane of the detector array, as the scanner is scanning an object at the end of a scan.

2. The scanner of claim 1 wherein:
the plurality of detectors are disposed in an air-borne, or in a space-borne platform, and
the platform is configured to move in an along-track direction, and a scan angle of the detector array is formed in a scan line that scans in a cross-track direction, which is perpendicular to the along-track direction.

3. The scanner of claim 2 wherein:
the scan angle of the detector array includes an end of scan (EOS) angle defined in the cross-track direction, and
a maximum amount of image rotation in $\psi_{max}$ is equal to the EOS angle.

4. The scanner of claim 3 wherein:
the scan angle of the detector array is varied by the scan mirror receiving light from a surface of the object.

5. The scanner of claim 1 wherein:
each of the plurality of detectors in the left array are configured to simultaneously generate an electrical signal proportional to scene radiance of the object, and
each of the plurality of detectors in the right array are configured to simultaneously generate another electrical signal proportional to scene radiance of the object.

6. The scanner of claim 5 wherein:
the left array includes at least two linearly arranged detectors, and
the right array includes at least two linearly arranged detectors.

7. The scanner of claim 1 wherein:
the single mirror rotates about the shaft, and the telescopic optical axis that intersects the mirror,
a scan angle of the detector array varies between (a) nadir, which corresponds to a line extending from a middle of a base of the isosceles triangle and intersecting at the apex, and (b) an end of scan (EOS), which corresponds to a maximum angle between the line extending from the middle of the base to form the nadir and a maximum scan angle projected onto the object, and
a maximum amount of image rotation in the angle of $\psi_{max}$ is equal to the scan angle of the detector array at the EOS.

8. The scanner of claim 7 wherein a maximum angle of $\psi_{max}$ is larger than 56 degrees.

9. The scanner of claim 1 wherein:
the right array is tilted by an amount equal to a maximum angle of $\psi_{max}$,
the left array is tilted in an opposite direction to the right array by an amount equal to the maximum angle of $\psi_{max}$, the scanner is disposed in a platform, and
the maximum angle of $\psi_{max}$ corresponds to a maximum scan angle of the detector array in a direction perpendicular to a direction of travel of the platform.

10. The scanner of claim 1 wherein:
the detector array is configured to provide a left scan of the object and a right scan of the object, where a dividing line between the left scan and the right scan is formed by a line extending from a middle of a base of the isosceles triangle to the intersecting apex,
the left array is configured to collect imagery during the right scan, and
the right array is configured to collect imagery during the left scan.

11. The scanner of claim 1, wherein:
the detector array is offset in a cross-track direction and away from an along-track vector, the offset causing the image rotation to compensate for motion of the scanner in the along-track direction; and
the received image is symmetrical about a nadir of the imaged surface.

12. A line scanner scanning in a cross-track direction and moving forward on a platform in an along-track direction, the line scanner comprising:
a single-sided scan mirror coupled to a rotating shaft that rotates the single sided scan mirror offset from an axis of an optical telescope; and
a plurality of detectors forming a left array and a plurality of detectors forming a right array, wherein:
the left array and the right array are tilted away from a line formed in the along-track direction, at an angular amount based on a maximum image rotation angle of an image received at an end of scan of the left and right arrays of detectors;
the left array is configured to detect scene radiance from a surface of an object when the line scanner is scanning the surface on the a right side of the line formed in the along-track direction, and
the right array is configured to detect scene radiance from the surface of the object when the line scanner is scanning the surface on a left side of the line formed in the along-track direction.

13. The line scanner of claim 12 wherein:
each of the left and right arrays each includes more than two detectors arranged linearly in the respective array, and
the detectors in each respective array are configured to simultaneously detect the scene radiance.

14. The line scanner of claim 12, wherein the surface of the object is the surface of the Earth.

15. The line scanner of claim 11 wherein:
the left and right arrays are configured to simultaneously detect the scene radiance and output signal samples, as the line scanner scans between nadir and an end of scan (EOS) , and
the output signal samples are aggregated in the along scan direction and in the cross-track direction.

16. The line scanner of claim 15 wherein:
the output signal samples are first aggregated in the along-track direction and, second aggregated in the cross-track direction, and
the first and second aggregation form one scan line.

17. A method of scanning a surface of the Earth, in which a line scanner including a single sided scan mirror coupled to a rotating shaft and multiple detectors that are aligned in an airborne, or space borne platform, the method comprising the steps of:
sampling radiance received from the surface of the Earth by multiple detectors in a bees-wing geometry, the bees-wing geometry being defined as an isosceles triangle formed by a first half of the detectors and a second half of the detectors as two equal sides of the isosceles triangle having two equal base angles of $\psi_{max}$, wherein:
$\psi_{max}$ is defined as a maximum amount of image rotation caused by a geometry of a single sided scan mirror coupled to a rotating shaft that causes a scanned image to be rotated on a focal plane of the multiple detectors, as the scan mirror is scanning an object at the end of a scan;
the first half of the detectors are tilted away in a left direction from a line formed in an along-track direction, and the second half of the detectors are tilted away in a right direction from the line formed in the along-track direction; wherein, the sampling radiance comprises steps of:
using the first half of the detectors to scan on the right side of the line in the along-track direction, and
using the second half of the detectors to scan on the left side of the line in the along-track direction;
aggregating samples from the first half of the detectors;
aggregating samples from the second half of the detectors;
resampling the aggregated samples from the first half detector and the second half detector to provide a uniform ground sample distance across the line in the along-track direction;
aggregating samples from the first half detector and the second half detector in a cross-track direction, which is perpendicular to the along-track direction;
resampling the aggregated cross-track samples from the first half detector and the second half detector to provide resampled cross-track data; and
providing imagery on a Cartesian grid based on the resampled cross-track data.

18. The method of claim 17, wherein the isosceles triangle includes an apex that is intersected by the two equal sides of the isosceles triangle and the line formed in the along-track direction.

19. The method of claim 18, wherein the angle $\psi_{max}$ includes a maximum angle that is dependent on a maximum scan angle in a cross-track direction, which is perpendicular to the along-track direction.

* * * * *